United States Patent [19]

Tashiro et al.

[11] Patent Number: 4,582,334
[45] Date of Patent: Apr. 15, 1986

[54] STEERING SYSTEM FOR VEHICLES

[75] Inventors: Yutaka Tashiro; Yoshimi Furukawa, both of Saitama; Shoichi Sano, Tokyo, all of Japan

[73] Assignee: Honda Giken Kogyo Kabushiki Kaisha, Tokyo, Japan

[21] Appl. No.: 541,132

[22] Filed: Oct. 12, 1983

[30] Foreign Application Priority Data

Oct. 13, 1982 [JP] Japan ............................... 57-180382
Oct. 13, 1982 [JP] Japan ............................... 57-180383

[51] Int. Cl.[4] .............................................. B62D 5/10
[52] U.S. Cl. ...................................... 280/91; 180/148
[58] Field of Search .................. 280/771, 91; 180/148; 74/29, 30, 109, 437

[56] References Cited

U.S. PATENT DOCUMENTS 2,973,658  3/1961  Bishop ................................. 180/148
4,467,885  8/1984  Furukawa et al. .................. 180/148

FOREIGN PATENT DOCUMENTS 130863  8/1982  Japan ................................. 180/148

Primary Examiner—John A. Pekar
Assistant Examiner—Ross Weaver
Attorney, Agent, or Firm—Irving M. Weiner; Joseph P. Carrier; John J. Cantarella

[57] ABSTRACT

A steering system for a vehicle having a steering wheel and front and rear wheels, including a front steering sub-system for steering the front wheels in accordance with the steering angle of the steering wheel and a rear steering sub-system for steering the rear wheels in the same and opposite directions with respect to the front wheels in accordance with the steering angle of the steering wheel. The steering system is provided with a rack and pinion type variable-ratio mechanism for varying the ratio of the steered angle of at least either of the front or rear wheels to the steering angle of the steering wheel in accordance with the magnitude of the steering angle of the steering wheel. The design freedom in setting a functional relation between the steering angle of the steering wheel and the turning curvature of the vehicle is thus maximized. Moreover, selective setting is permitted for change of ratio of the steered angle of the rear wheels to the steering angle in the vicinity of the initial position of the steering wheel. Further, there is permitted a favorable use of available vehicle dimensions to achieve an optimum feeling characteristic of steering operation.

4 Claims, 20 Drawing Figures

STEERING SYSTEM FOR VEHICLES

BACKGROUND OF THE INVENTION

1. Field of the Invention

The present invention relates generally to a steering system for vehicles. More particularly, the invention relates to a steering system for a vehicle including a steering wheel and front and rear wheels, in which the front and rear wheels are steerable in the same and opposite directions relative to each other in accordance with the steering angle of the steering wheel.

2. Description of Relevant Art

There have been proposed steering systems for vehicles, such as disclosed in Japanese Patent Application No. 56-118698, in which a rear wheel steering sub-system includes left and right rear wheel steering tie rods directly or indirectly connected to and supported by an off-centered pin arranged to be rotatable with rotation taken out from a front wheel steering sub-system. The left and right rear wheels are thus capable of being steered both in the same and opposite directions with respect to the left and right front wheels in accordance with the steering angle of a steering wheel. The rotation from the front wheel steering sub-system is taken out through a linkage having a rotary member provided with the aforesaid off-centered pin, which rotates in a crank-like manner while functioning to steer the rear wheels as described hereinabove, i.e., permitting the rear wheels to be steered in the same direction as the front wheels for relatively small steering angles of the steering wheel and in the opposite direction for relatively large steering angles thereof. Accordingly, there is provided favorable maneuverability characteristics when the vehicle is moving at relatively high speeds, as well as favorable turning characteristics due to relatively small turning radii, such turning characteristics being particularly advantageous with respect to effecting a U-turn or when parking, etc.

In such types of steering systems for vehicles, it is desirable to maximize the freedom of design in setting the relation between the steering wheel steering angle and the turning curvature of the vehicle, so as to accommodate various driving tastes relating to steering characteristics when rounding curves or corners or driving at high speeds.

The present invention provides the aforesaid desired design freedom in a steering system for vehicles.

SUMMARY OF THE INVENTION

The present invention provides, in a steering system for a vehicle having a steering wheel and front and rear wheels, including a front steering sub-system for steering the front wheels in accordance with the steering angle of the steering wheel and a rear steering sub-system for steering the rear wheels in the same and opposite directions with respect to the front wheels in accordance with the steering angle of the steering wheel, an improvement comprising a variable-ratio mechanism for varying the ratio of the steered angle of at least either of the front and rear wheels to the steering angle of the steering wheel in accordance with the magnitude of the steering angle of the steering wheel.

An object of the present invention is to provide, in a steering system for vehicles of the type which permits front and rear wheels to be steered in the same and opposite directions relative to each other in accordance with the steering angle of a steering wheel, maximization of the freedom of design in setting a functional relation between the steering angle of the steering wheel and the turning curvature of the vehicle, whereas the turning curvature is substantially proportional to the steered angle of the front wheels minus that of the rear wheels while the vehicle is moving at a constant speed.

Another object of the present invention is to provide, in a steering system for vehicles of the aforesaid type which also includes a rack and pinion mechanism for steering front and rear wheels, an improvement wherein, in addition to the maximized freedom of design in setting a function between the steering angle of a steering wheel and the turning curvature of the vehicle, a selective setting is permitted for a change of ratio of the steered angle of the rear wheels to the steering angle in the vicinity of the initial position of the steering wheel. Thus, an optimum design is provided for the feeling characteristics of steering operation, particularly for driving at high speeds.

Yet another object of the present invention is to provide in a steering system for vehicles of a type similar to that described above, while including an off-centered crank pin for steering the rear wheels, an improvement which also permits selective setting of a change of ratio of the steered angle of the rear wheels to the steering angle of a steering wheel, thereby advantageously employing available vehicle dimensions for the rear wheels to achieve an optimum feeling of steering operation.

The above and further features, objects and advantages of the present invention will become apparent from the following detailed description of preferred embodiments of the invention when the same is read in conjunction with the accompanying drawings.

DETAILED DESCRIPTION OF PREFERRED EMBODIMENTS

In general, for a four-wheeled vehicle moving at a constant speed, the radius R of turning curvature may be represented in terms of an angle $\delta f$ by which its front wheels are steered from the original positions thereof, and another angle $\delta r$ by which its rear wheels are steered from the original positions thereof. More particularly, the turning radius R can be given in terms of a function of the front wheels steered angle $\delta f$ minus the rear wheels steered angle $\delta r$.

Assuming that, while turning, the vehicle has a small transverse acceleration and a cornering force produced linearly for slide angles of the front and rear wheels, the turning radius R can be expressed substantially as follows:

$$R = \frac{L(1 + KV^2)}{\delta f - \delta r} \quad \text{(i)}$$

where
L is the wheel base of the vehicle,
V is the advancing speed of the vehicle; and
K is what is referred to as a stability factor which is given by the following equation:

$$K = \frac{C_r L_r - C_f L_f}{2 C_r C_f l^2} M$$

where
Cf and Cr are respective cornering forces of the front and rear wheels;
Lf and Lr are respective distances from the center of gravity of the vehicle to front and rear axles thereof; and M is the mass of the vehicle.

From equation (i), it is apparent that the turning radius R is inversely proportional to the front wheels steered angle $\delta f$ minus the rear wheels steered angle $\delta r$.

Figure 1:
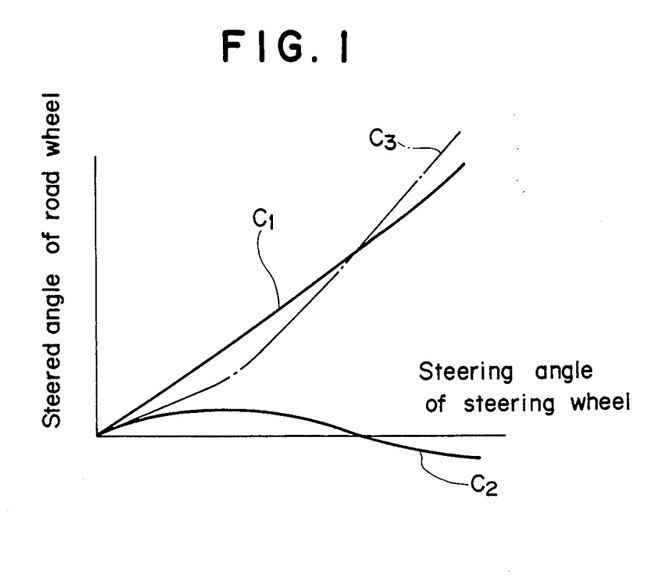
FIG. 1 is a graph showing typical general relations of the steered angle of the road wheel to the steering angle of the steering wheel.

Referring now to FIG. 1, in which the ordinate represents a steered angle of road wheel and the abscissa represents a steering angle of steering wheel, C1 and C2 are curves representing the steered angle $\delta f$ of the front wheels and the steered angle $\delta r$ of the rear wheels, respectively, of a vehicle of the type in which the rear wheels are steerable in both the same and opposite directions with respect to the front wheels in accordance with the steering angle of a steering wheel, while the front wheels are both steered linearly or proportionally to the rotation of the steering wheel by means of a well-known rack and pinion mechanism. C3 is a curve representing the difference between the front wheels steered angle $\delta f$ and the rear wheels steered angle $\delta r$. As shown in FIG. 1, the curve C3 curvilinearly rises, crossing the curve C1 at an abscissa where the rear wheels come back to their initial positions.

Returning now to equation (i), letting $\rho$ represent the turning curvature of the vehicle, $$\rho = \frac{1}{R} = \frac{f - r}{L(1 + KV^2)} \quad \text{(ii)}$$

Thus, it is apparent that the turning curvature $\rho$ is proportional to ($\delta f - \delta r$). In accordance with the relation of this turning curvature with the steering angle of a steering wheel, each driver can individually determine to what extent the steering wheel should be rotated when driving through various curves in roads.

Figure 2:
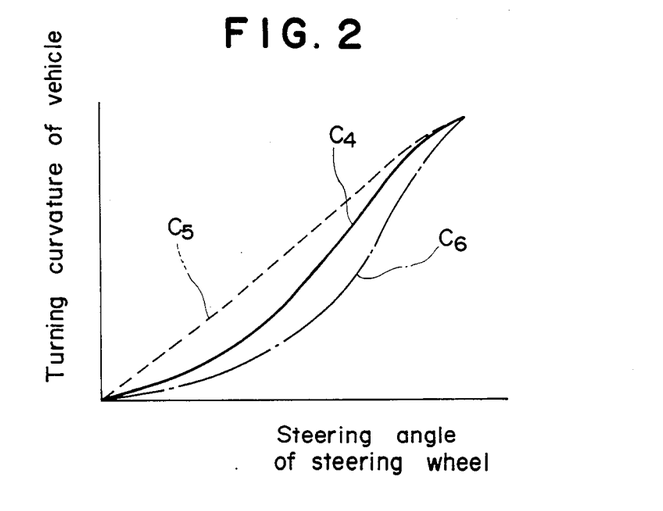
FIG. 2 is a graph showing typical general relations of the turning curvature of the vehicle to the steering angle of the steering wheel.

Referring now to FIG. 2, in which the ordinate represents a turning curvature of the vehicle and the abscissa represents a steering angle of the steering wheel, C4 is a curve representing the turning curvature $\rho$ of the vehicle of FIG. 1 and thus corresponding to the curve C3. As will be understood from equation (ii) and the curve C3, the curve C4 is non-linear to some extent. Some drivers may favor such a functional relation of the turning curvature with the steering angle of the steering wheel. However, such a steering function may not suit the taste of another driver who prefers a relation closer to linearity, i.e., such as shown by a curve C5. In contrast, yet another driver may favor a non-linear relation, i.e., such as represented by a curve C6. In other words, with respect to the relation of the turning curvature to the steering angle, different drivers prefer different functions.

Letting $\delta s$ be the steering angle of a steering wheel, the rear wheels steered angle $\delta r$ is now assumed to be in a non-linear functional relation therewith as shown below:

$$\delta r = F(\delta s) \quad \text{(iii)}$$

In the conventional case, where the front wheels steered angle $\delta f$ is proportional to the steering wheel steering angle $\delta s$, $$\delta f = \frac{1}{N} \delta s$$

where N is a constant representing a steering gear ratio of a known type front steering sub-system for steering front wheels.

Thus, in this case, the difference of the steered angles $\delta f$ and $\delta r$ becomes as follows:

$$\delta f - \delta r = \frac{1}{N} \delta s - f(\delta s)$$

Figure 3:
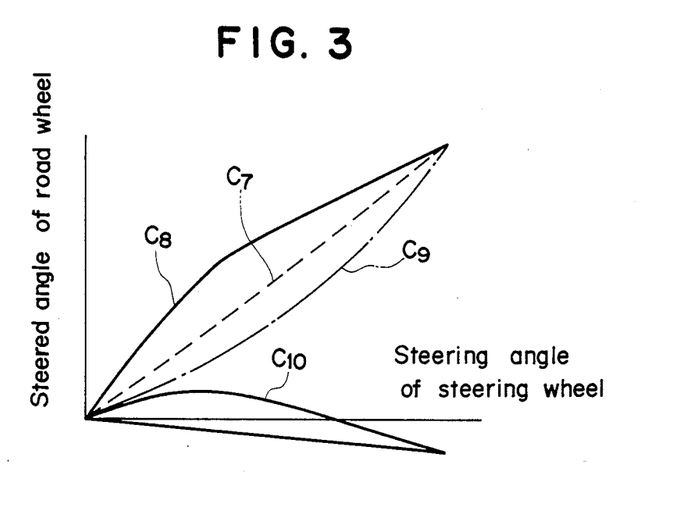
FIG. 3 is a graph for explaining relations of the steered angle of the front wheels to the steering angle of a steering wheel in a steering system for vehicles according to a first embodiment of the invention.
Figure 4:
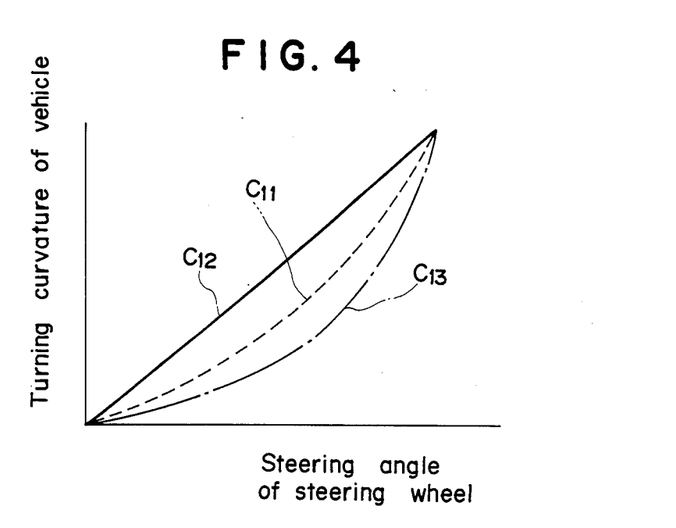
FIG. 4 is a graph for explaining relations of the turning curvature of the vehicle to the steering angle of the steering wheel in the steering system of FIG. 3.

Referring now to FIG. 3, in which the ordinate represents a steered angle of road wheel and the abscissa represents a steering angle of the steering wheel, and to FIG. 4, in which the ordinate represents a turning curvature of the vehicle and the abscissa represents the steering angle of the steering wheel of FIG. 3, C7 and C11 are curves corresponding to, in the aforesaid conventional case, the front wheels steered angle $\delta f$ and the turning curvature $\rho$ which is proportional to the steered angle difference $\delta f - \delta r$, respectively.

Apart from the conventional case, and with further reference to equation (iii), the front wheels steered angle $\delta f$ is now assumed to be in a functional relation relative to the steering wheel steering angle $\delta s$ as shown below.

$$\delta f = g(\delta s) + f(\delta s) \quad (iv)$$

where $g(\delta s)$ is a selected function.
From equation (iv), $$\delta f - \delta r = g(\delta s) \quad (v)$$

By substituting equation (v) into equation (ii), $$\rho = \frac{1}{R} = \frac{1}{L(1 + KV^2)} g(\delta s) \quad (vi)$$

Accordingly, while the vehicle speed V is constant, the relation between the turning curvature and the steering wheel steering angle $\delta s$ can be selectively set by varying the function $g(\delta s)$.

For example, referring again to FIGS. 3 and 4, for the turning curvature $\rho$, a substantially linear curve C12 as a function of the steering wheel steering angle $\delta s$ is obtainable by giving a linear form to the function $g(\delta s)$, such that $g(\delta s) = k\delta s$ where k is a constant, which means a corresponding curve C8 of the front wheels steered angle $\delta f$ is properly set equal to the linear function $g(\delta s)$ plus the rear wheels steered angle $\delta r$ given in the form of a curve C10. Moreover, even a curve C13 of greater non-linearity can be established with ease by changing the front wheels steered angle $\delta f$ along a proper curve C8 which is correspondingly curved downwardly in FIG. 3.

Figure 5:
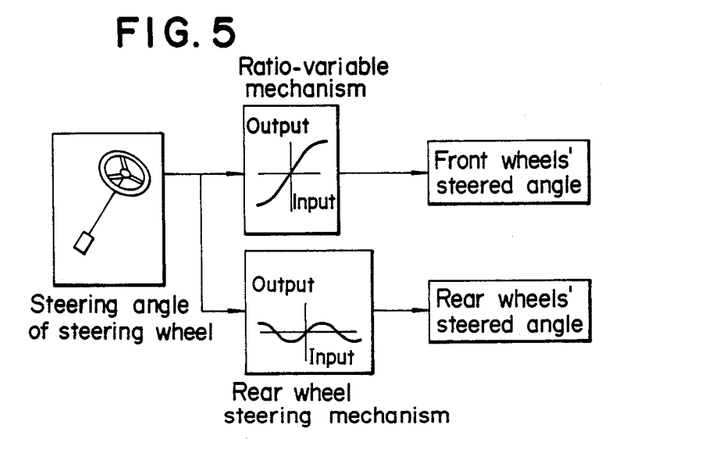
FIG. 5 is a functional block diagram of the steering system of FIG. 3.

Referring now to FIG. 5, showing a steering system according to the first embodiment of the invention, the steering system comprises a front steering sub-system for steering front wheels in accordance with the rotation of a steering wheel and a rear steering sub-system for steering rear wheels. The front steering sub-system has a variable-ratio mechanism provided, for example, in a front steering gas box, the variable-ratio mechanism varying the ratio of the steered angle of the front wheels to the steering angle of the steering wheel in accordance with the magnitude of the steering wheel steering angle. At the steering wheel side of the variable-ratio mechanism, the required rotation for the rear wheel steering is taken out from the front steering sub-system and transmitted to a rear wheel steering mechanism constituting the rear steering sub-system, the rear wheel steering mechanism comprising, for example, a linkage and an off-centered crank pin arranged so as to steer the rear wheels in the same and opposite directions relative to the front wheels in accordance with the steering angle of the steering wheel.

Referring now to FIGS. 6 to 10, there is set forth hereinbelow a detailed structural description of the steering system according to the first embodiment of the invention.

Figure 6:
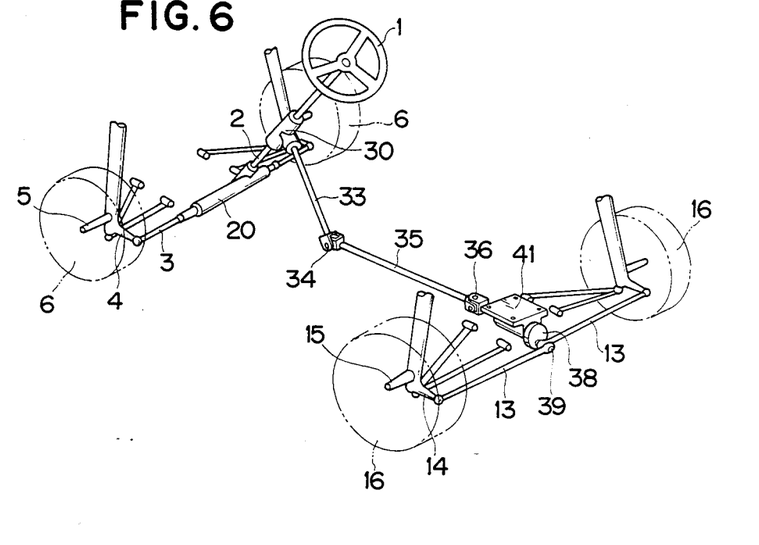
FIG. 6 is a perspective view, taken from the upper left, of the steering system of FIG. 5.

In FIG. 6, designated at reference numeral 1 is a steering wheel. The steering wheel 1 is provided with a steering shaft 2 assembled at the distal end thereof in a front steering gearbox 20 of a rack and pinion type.

Figures 7, 8:
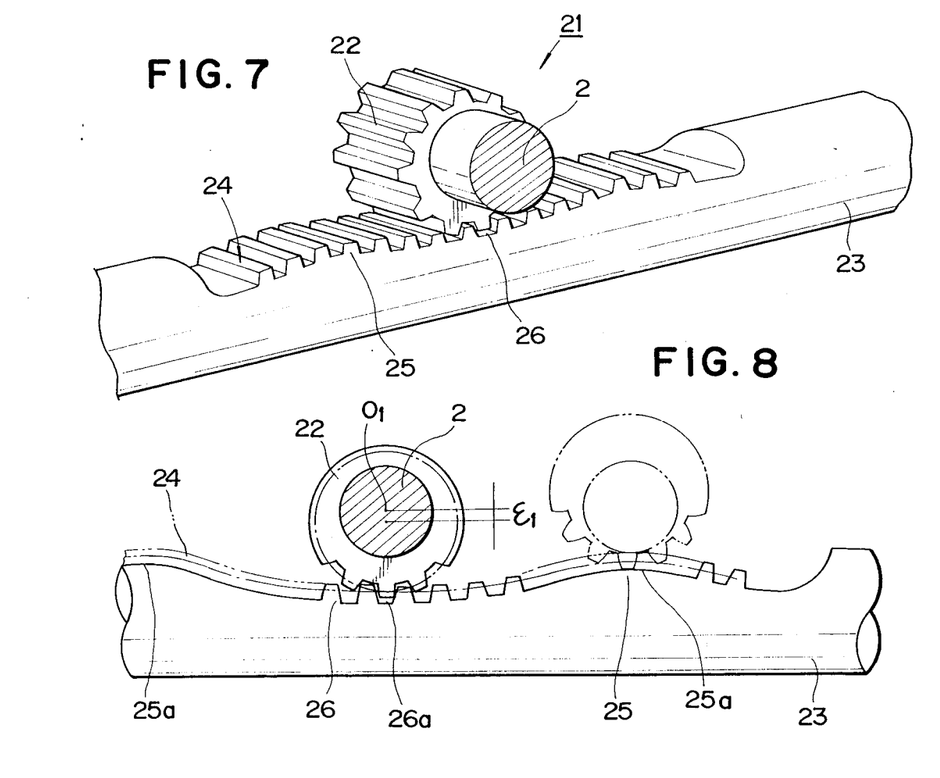
FIG. 7 is an enlarged perspective view, taken from the upper left, of a variable-ratio mechanism of the steering system of FIG. 6.
FIG. 8 is a top view of the variable-ratio mechanism of FIG. 7.

As shown in FIGS. 7 and 8, in the gearbox 20, the steering shaft 2 has at the distal end thereof a piston 22 constituting a variable-ratio mechanism 21 together with a rack 24 formed on a rack shaft 23. The pinion 22, serving as a drive element in the variable-ratio mechanism 21, is off-centered by a distance $\epsilon_1$ with respect to the center axis $0_1$ of the steering shaft 2. On the other hand, the rack 24, engaged as a driven element with the pinion 22, is deformed with a pair of chevrons 25 and a central trough 26 in a wave-like continuous manner, while a half of the level difference between a peak 25a of each chevron 25 and a bottom 26a of the trough 26 is predetermined to be equal to the off-centered distance $\epsilon_1$. The rack 24 is dimensioned such that the wave pitch between the peaks 25a of the chevrons 25 is in accord with a single revolution of the pinion 22. Moreover, the pinion 22 has an initial or neutral position thereof arranged at the bottom 26a of the trough 26, where its axis of rotation just comes on a line interconnecting the center $0_1$ of the steering shaft 2 and the midpoint of the bottom 26a. As a result, the pinion 22 has an apparent pitch circle diameter thereof which is variable as it rotates with the steering shaft 2 about the axis $0_1$, and thus the feed of the deformed rack 24 varies in accordance therewith, i.e., in accordance with the magnitude of the steering angle of the steering wheel 1. In the above-described arrangement, in which the initial position of the pinion 22 is preset at the bottom 26a of the trough 26, the apparent pitch circle diameter of the pinion 22 becomes shorter as the steering shaft 2 rotates to a half revolution, thus gradually reducing the stroke or feed of the rack shaft 23.

In this respect, there may be employed a modified arrangement in which the initial position of an off-centered pinion is preset at the peak of a chevron on a deformed rack. In this case, the feed of the rack will be gradually increased as the pinion rotates to a half revolution.

Moreover, as shown in FIG. 6, the rack shaft 23 is projected at either end thereof from both sides of the front steering gearbox 20 and connected to respective inner ends of a pair of tie rods 3, 3, each connected at the outer end thereof to one of a pair of knuckle arms 4, 4 which have their axle shaft 5, 5 projecting outwardly and supporting either one of a pair of front wheels 6, 6.

The steering of the front wheels 6, 6 is concurrently effected by operating the steering wheel 1. As the steering shaft 2 rotates with the steering wheel 1, the steering rotation is converted, through the engagement between the off-centered pinion 22 and the deformed rack 24, into a non-linear transverse displacement of the rack shaft 23 with respect to the gearbox 20. Concurrently, this displacement makes, through the tie rods 6, 6, the knuckle arms 4, 4 turn transversely by a non-linear angle change. Accordingly, the front wheels 6, 6 supported by the knuckle arms 4, 4 are steered in a non-linear manner in accordance with the steering angle of the steering wheel 1.

Further, as shown in FIG. 6, the steering shaft 2 has at the intermediate part thereof a gearbox 30 fitted thereon, the gearbox 30 being adapted for taking-out the rear wheel steering angle.

Figures 9, 10:
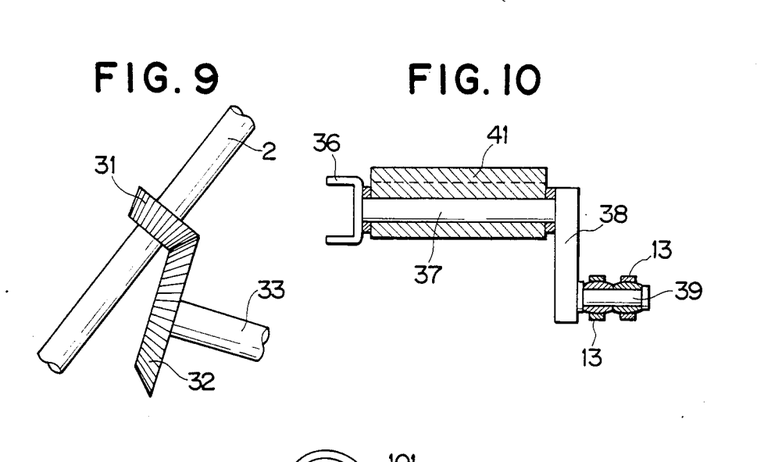
FIG. 9 is an enlarged side view of a connecting part between front and rear steering sub-systems of the steering system of FIG. 6.
FIG. 10 is an enlarged longitudinal sectional view of an essential part, including a crank pin mechanism for steering rear wheels, of the steering system of FIG. 6.

As shown in detail in FIG. 9, in the gearbox 30 there is arranged a small bevel gear 31 fitted on and secured to the steering shaft 2 and a large bevel gear 32 in meshing engagement with the small bevel gear 31, the large bevel gear 32 being secured to the front end of a driven shaft 33 extending rearwardly downward. The driven shaft 33 is connected at the rear end thereof through a universal joint 34 to the front end of a link shaft 35 arranged substantially horizontally as shown in FIG. 6.

As shown in FIG. 10, the link shaft 35 is connected at the rear end thereof through a universal joint 36 to the front end of a crank shaft 37 which is transversely centrally disposed and rotatably supported by a bearing bracket 41. The crank shaft 37 has at the rear end thereof a crank arm 38 provided at the back with an off-centered crank pin 39 projecting rearwardly therefrom to interconnectingly support left and right tie rods 13, 13 commonly loose-fitted thereon.

Further, as shown in FIG. 6, the tie rods 13, 13 are each connected at the outer end thereof to one of a pair of knuckle arms 14, 14 having their axle shafts 15, 15 projecting outwardly and respectively supporting a pair of rear wheels 16, 16.

The gearboxes 20 and 30 and the bearing bracket 41 are each secured to a body (not shown) of the vehicle.

In the above-described arrangement, when the steering wheel 1 is operated to be steered, the steering rotation will be output, through the bevel gears 31, 32 meshingly engaged with each other in the gearbox 30, to the driven shaft 33 and transmitted therefrom through the link shaft 35 to the crank shaft 37. The crank shaft 37, which is arranged to be rotatable in proportion to the steering angle of the steering wheel 1, will rotate integrally with the crank pin 39. With this crank motion, the left and right tie rods 13, 13 will move transversely, thereby transversely turning the knuckle arms 14, 14 and likewise the rear wheels 16, 16. In this respect, the off-centered crank pin 39, which has the lowest position thereof set to be its initial or neutral position, will cause the rear wheels 16, 16 to be steered in the same direction as the front wheels 6, 6 for relatively small steering angles of the steering wheel 1, and in the opposite direction thereto while the steering angle of the steering wheel 1 is large enough to rotate the crank pin 39 more than a half revolution.

In the foregoing first embodiment of the invention, a variable-ratio mechanism comprises an off-centered drive pinion and a deformed driven rack. It will be understood, however, that there may be employed a modified variable-ratio mechanism comprising a drive pinion with tooth pitches gradually changed along the circumference and a driven rack with tooth pitches properly varied lengthwise from the center to both ends. Moreover, the rear steering sub-system described hereinabove is merely illustrative, and may be of any other suitable type.

In this respect, there may be employed a rear steering sub-system comprising a driven pinion as an input member in meshing engagement with a driven rack in a variable-ratio mechanism of a front steering sub-system, and an off-centered crank pin as an output member arranged similarly to that of the first embodiment for causing the rear wheels to be steered in the same and opposite directions with respect to the front wheels.

In such arrangement, however, the non-linearity in a variable-ratio mechanism of a front steering sub-system is to be directly input to a driven pinion and transmitted to a crank pin, thus giving a certain effect to the change of ratio of the steered angle of the rear wheels to the steering angle of a steering wheel, particularly in the vicinity of the initial or neutral position of the rear wheels.

Figure 11:
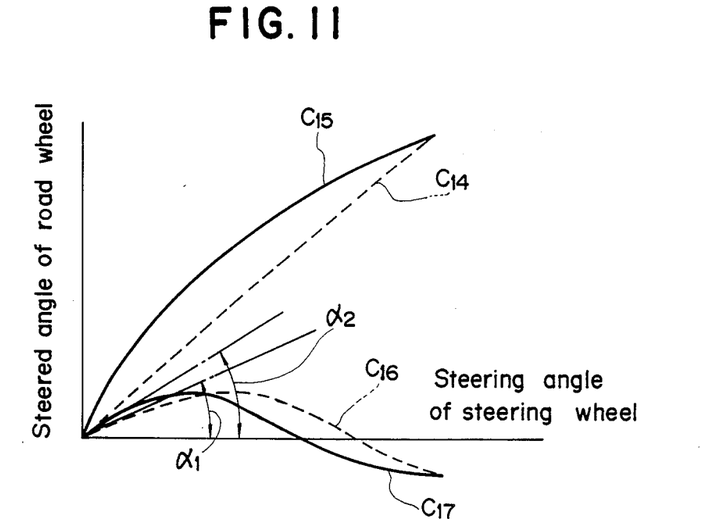
FIG. 11 is a graph for explaining an effect that the variable-ratio mechanism of FIG. 7 has on the change of ratio of the steered angle of the rear wheels to the steering angle of the steering wheel of FIG. 3.

With reference to FIG. 11, in which the ordinate represents a steered angle of road wheel and the abscissa represents a steering angle of steering wheel, when a curve C14 representing the front wheels steered angle $\delta f$ of a conventional steering system is modified to a curve C15 representing that of a steering system according to the first embodiment, the rear wheels steered angle $\Delta r$ of the former steering system represented by a curve C16 will be changed as shown by a curve C17. As a result, an angle $\alpha$ formed between the axis of abscissa and the tangential line of the rear wheel steering curve is changed from $\alpha 1$ to $\alpha 2$, whereas the vehicle maneuverability characteristics during travel at high speeds depends to a considerable degree on the angle $\alpha$.

As a favorable embodiment with respect to such points, a second embodiment of the invention will be described hereinbelow with reference to FIGS. 12 to 16.

Figure 12:
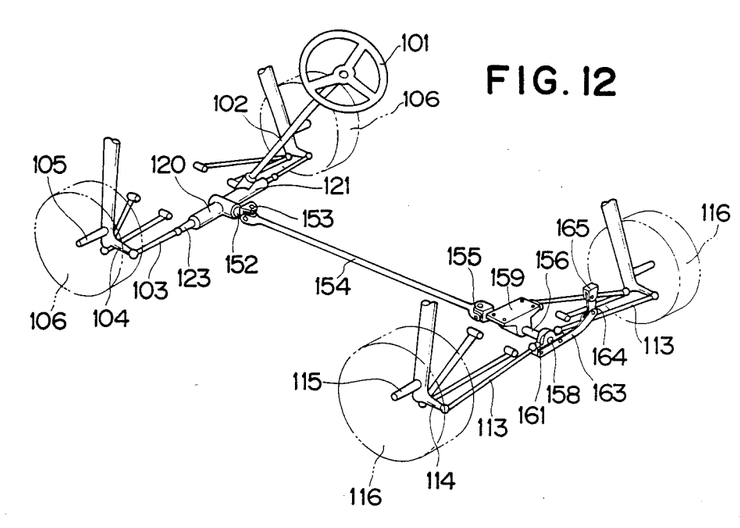
FIG. 12 is a perspective view, taken from the upper left, of a steering system for vehicles according to a second embodiment of the invention.

Referring first to FIG. 12, designated at reference numeral 101 is a steering wheel. The steering wheel 101 is provided with a steering shaft 102 assembled at the distal end thereof in a front steering gearbox 120 of a rack and pinion type.

Similar to the first embodiment, in the gearbox 120 the steering shaft 102 has at the distal end thereof an off-centered drive pinion (not shown) constituting a first variable-ratio mechanism 121 together with a deformed driven rack (not shown) on a rack shaft 123.

Moreover, the rack shaft 123 is projected at either end thereof from both sides of the gearbox 120 and connected to respective inner ends of a pair of tie rods 103, 103 each connected at the outer end thereof to one of a pair of knuckle arms 104, 104 which have their axle shafts 105, 105 projecting outwardly and respectively supporting a pair of front wheels 106, 106.

Figure 13:
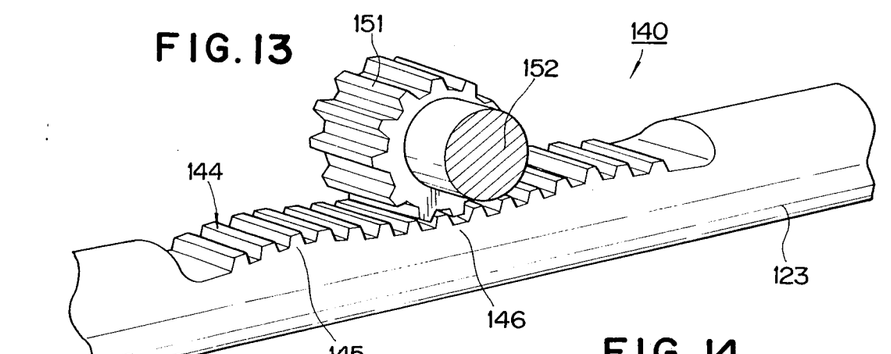
FIG. 13 is an enlarged perspective view, taken from the upper left, of a variable-ratio mechanism of the steering system of FIG. 12.
Figure 14:
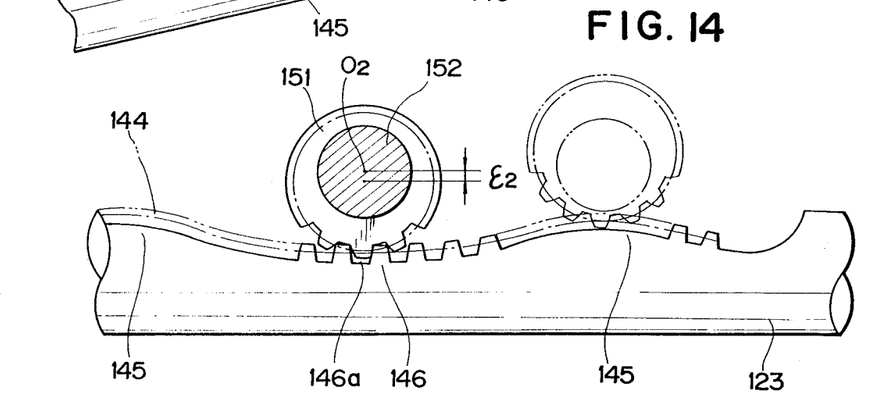
FIG. 14 is an explanatory rear view of the variable-ratio mechanism of FIG. 13.

As shown in FIGS. 13 and 14, on the left half part of the rack shaft 123 there is provided a second variable-ratio mechanism 140 comprising a deformed drive rack 144 and a driven pinion 151 in meshing engagement with the drive rack 144 and having a pinion shaft 152 off-centered by a distance $\epsilon 2$ from the axis of rotation of the driven pinion 151.

The rack 144 is deformed with a pair of chevrons 145 and a central trough 146 in a continuous wave-like manner, while a half of the level difference between a peak 145a of each chevron 145 and a bottom 146a of the trough 146 is predetermined to be equal to the off-centered distance $\epsilon 2$. The rack 144 is dimensioned such that the wave pitch between the peaks 145a of the chevrons 145 is in accord with a single revolution of the driven pinion 151. The pinion shaft 152 has an initial or neutral position thereof arranged at the bottom 146a of the trough 146, where its center $0_2$ just comes on a line passing through the axis of rotation of the driven pinion 151 and the midpoint of the bottom 146a. At each side of the initial position, the deformed rack 144 has a length of three-fourth wave pitches. Due to the off-centering of the pinion shaft 152, the driven pinion 151 has an apparent pitch circle diameter thereof, about the axis $0_2$, variable with the feed of the deformed rack 144, and thus the driven angle of the pinion shaft 152 varies in accordance therewith.

Figure 15:
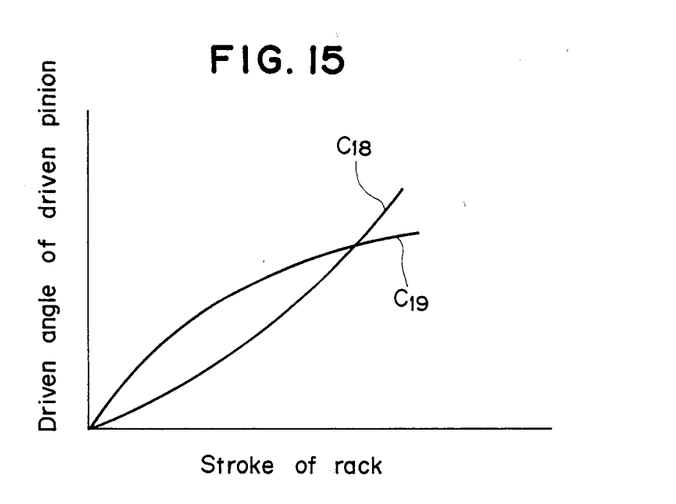
FIG. 15 is a graph for explaining a relation of the driven angle of a driven pinion with the stroke of a rack in the variable-ratio mechanism of FIG. 13.

In the above-described arrangement, in which the initial position of the pinion shaft 152 is preset at the bottom 146a of the trough 146, the apparent pitch circle diameter of the driven pinion 151 becomes smaller as the stroke of the deformed rack 144 increases up to a half revolution of the driven pinion 151, as shown by a curve C18 in FIG. 15, in which the ordinate represents a driven angle of driven pinion and the abscissa represents a stroke of rack.

In this respect, there may be employed a modified arrangement in which the initial position of an off-centered pinion shaft is preset at the peak of a chevron on a deformed rack. In this case, the apparent pitch circle diameter of a driven pinion becomes larger as the stroke of the rack increases up to a half revolution of the driven pinion, thus correspondingly increasing the driven angle of the driven pinion as shown by a curve C19 in FIG. 15.

Further, as shown in FIG. 12, the pinion shaft 152 is rearwardly projected out of the gearbox 120 and connected through a universal joint 153 to the front end of a long link shaft 154 which is in turn connected at the rear end thereof through a universal joint 155 to the front end of a crank shaft 156 transversely centrally disposed. The crank shaft 156 is rotatably supported by a bearing bracket 159 and has at the rear end thereof a flanged part 157 provided on the back with a crank pin 158 projecting rearwardly therefrom.

Figure 16:
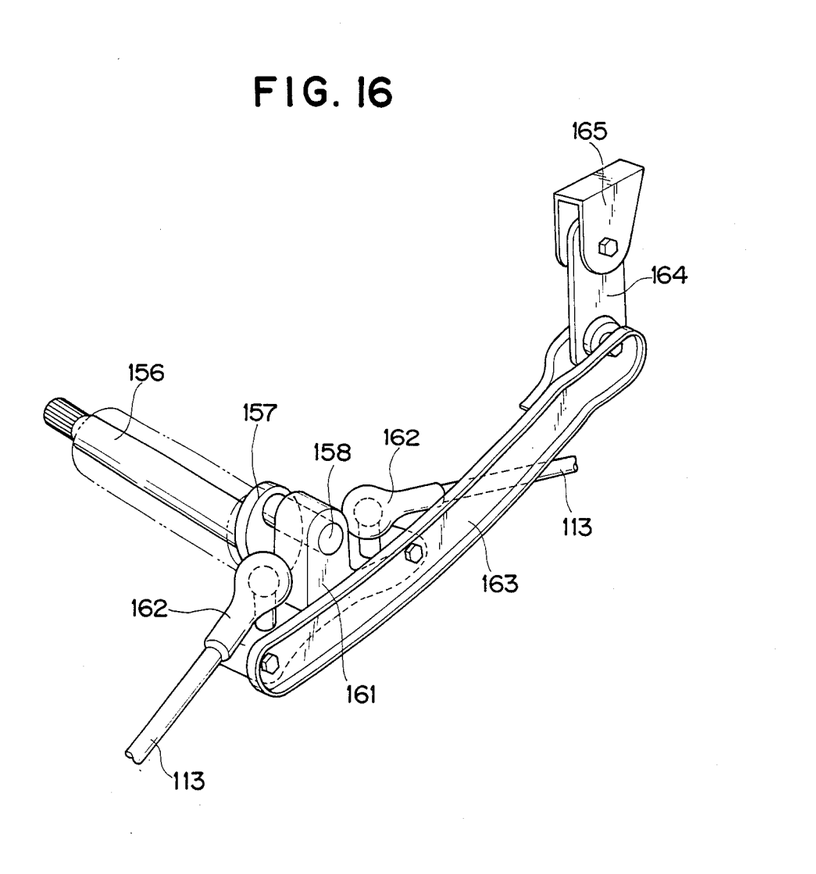
FIG. 16 is an enlarged perspective view, taken from the upper rear left, of an essential part of the steering system of FIG. 12, including a crank pin mechanism for steering the rear wheels.

As shown in detail in FIG. 16, the crank pin 158 is supportively loose-fitted in a joint member 161 supportively interconnecting left and right tie rods 113, 113 through left and right ball joints 162, 162, the joint member 161 being swingably suspended from a vehicle body (not shown) of the vehicle through a link bracket 165, a link 164 and an arm 163.

Further, as shown in FIG. 12, the tie rods 113, 113 are each connected at the outer end thereof to a pair of knuckle arms 114, 114 having their axle shafts 115, 115 projecting outwardly and respectively supporting a pair of rear wheels 116, 116.

The gearboxes 120 and 130 and the brackets 159 and 165 are all secured to the vehicle body.

In the above-described arrangement, when the steering wheel 101 is operated to be steered, the rate of stroke of the rack shaft 123 will be varied through the first variable-ratio mechanism 121 in accordance with the steering angle of the steering wheel 101 as described with respect to the first embodiment of the invention.

In this second embodiment, apart from such steering ratio variation for the front wheels 106, 106, the rack shaft 123, which has the second variable-ratio mechanism 140 in the left part thereof, permits a steering ratio variation for the rear wheels 116, 116 as explained hereinbelow.

When the rack shaft 123 is transversely moved at a stroke rate varied by the first variable-ratio mechanism 121, in the second variable-ratio mechanism 140, in which the driven pinion 151 is in meshing engagement with the rack 144 formed in the left part of the rack shaft 123, the following variations will be caused in the apparent pitch circle diameter of the driven pinion 151 which is supported to be centered at the axis $0_2$ of rotation of the off-centered pinion shaft 152.

Assuming the bottom 146a of the trough 146 to be the initial position of the driven pinion 151 as in the second embodiment, the apparent pitch circle diameter of the driven pinion 151 becomes smaller as the pinion shaft 152 rotates until the shaft 152 makes a half revolution or before it enters into engagement with the peak 145a of either chevron 145. Thus, the driven angle of the pinion shaft 152 is progressively increased, as is apparent when considering the relation between the center angle and radius of various arcs assumed to be of the same length.

As the pinion shaft 152 rotates by a progressively increasing angle to a half revolution, the link shaft 154 will likewise rotate together with the crank shaft 156, thereby causing the crank pin 158, which is secured to the crank shaft 156 in an off-centered manner and has its initial position preset at the lowest position thereof, to rotate in a crank-like manner to either the left or right as viewed from behind by a likewise increasing angle to a half revolution.

As will be understood, in the subsequent rotation of the pinion shaft 152 past either of the peaks 145a, i.e., between from one-half to three-fourth revolution thereof, the driven angle thereof will be increased at a progressively reduced rate, thus causing the crank pin 158 to rotate by a likewise increasing angle to three-fourth revolution.

On the other hand, while the crank pin 158 is rotated from the initial position to three-fourth revolution, the left and right tie rods 113, 113 supported by the joint member 161, which is loose-fitted on the crank pin 158 and restricted in swinging motion in conjunction therewith, will be carried at the inner ends thereof circularly along with the crank pin 158 and at the outer ends thereof transversely of the vehicle, thereby turning the knuckle arms 114, 114 about their vertical axes in accordance with the movements of the outer ends of the tie rods 113, 113. As a result, the rear wheels 116, 116 are steered in the same direction as the front wheels 106, 106 while the rotation of the crank pin 158 is within a half revolution, and in the opposite direction thereto while it is between one-half to three-fourth revolution.

It will be understood with respect to the above-described second embodiment of the invention that there may be employed a modified second variable-ratio mechanism comprising a driven pinion with tooth pitches gradually changed along the circumference and a drive rack with tooth pitches properly varied lengthwise from the center to both ends. Moreover, to achieve similar effects, there may be employed a modified arrangement in which a second variable-ratio mechanism of a type similar to that of the second embodiment or a modified example thereof is provided between a link shaft and an off-centered crank pin.

Incidentally, in the foregoing first and second embodiments of the invention, the steering system has a front steering sub-system provided with a variable-ratio mechanism to enable selective setting of the relation of the turning curvature of the vehicle to the steering angle of the steering wheel, while the rear steering sub-system is provided with an off-centered crank pin mechanism for causing the rear wheels to be steered in the same and opposite directions relative to the front wheels. Particularly, in the second embodiment, the rear steering sub-system has another variable-ratio mechanism adapted for accommodation of the tangential angle $\alpha$ or the change of ratio of the steered angle of the rear wheels to the steering angle of the steering wheel in the vicinity of the initial position of the rear wheels or, more exactly, the differential coefficient of the rear wheels steered angle $\delta r$ with respect to the steering wheel steering angle $\delta s$ near the origin, i.e., the value of a derived function $f'(\delta s) = d\delta r/d\delta s$ about $\delta s = 0$.

In this connection, with respect to a simple conventional steering system comprising a front steering sub-system of constant steering ratio and a rear steering sub-system with an off-centered crank pin mechanism, the design usually requires particular consideration to be given to the differential coefficient $d\delta r/d\delta s$ as explained hereinbelow.

Figure 17:
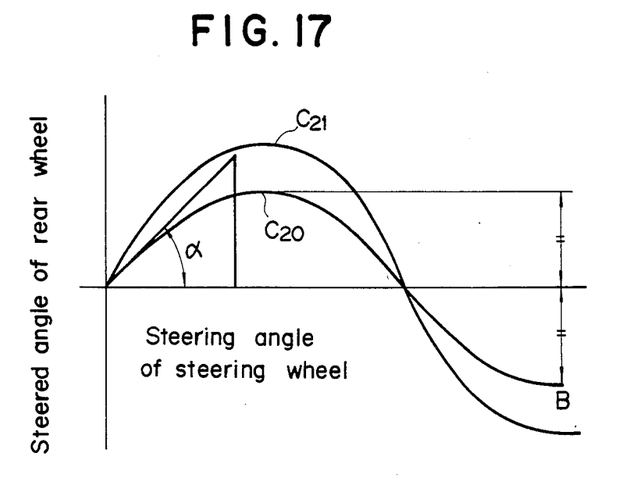
FIG. 17 is a graph for showing typical general effects that the available vehicle dimensions have on the change of ratio of the steered angle of the rear wheels to the steering angle of the steering wheel.

In the aforesaid simple steering system, when plotting the steered angle of the rear wheels for various steering angles of a steering wheel, there will result a rear wheel steering characteristic curve substantially in the form of a sine curve due to the circular motion of a crank pin as shown in FIG. 17, in which C20 is such a characteristic curve represented by the following equation:

$$\delta r = f(\delta s) = B \sin \delta s$$

where B is the maximum steered angle of the rear wheels, which generally corresponds to the rear wheels steered angle $\delta r$ at the boundary of the domain of the steering wheels steering angle $\delta s$ and is limited by the vehicle dimensions available for the steering system. In general, such an extreme value is desired to be as large as possible since it provides the minimum radius of turning curvature of a vehicle, which is critical for steering operations such as garaging and parking or cornering at very low speeds. As well known, such a sine function will be readily determined when B is given. To find the tangential angle $\alpha$ of the curve C20, when taking the differential coefficient of this function: $\tan \alpha = f'(\delta s) = B \cos \delta s$. Thus, $\alpha = \text{Tan}^{-1} f'(\delta s)$ which is still readily determinable by giving the constant B. Therefore, for various steering angles of the steering wheel, the tangential angle $\alpha$ is in the relation of a one-to-one correspondence with respect to the maximum steered angle B, which implies the necessity of particular consideration for the differential coefficient $d\delta r/d\delta s$ or the tangential angle $\alpha$, particularly in the vicinity of the initial position of the rear wheels or near the origin $\delta s = 0$, where the vehicle is generally driven at relatively high speeds. For example, to raise the steering sensitivity in the high-speed region, when the characteristic curve C20 is desired to be changed to a more sensitive curve C21 in FIG. 17, such a desire will not be met for the above-mentioned reason.

With the foregoing considerations in mind, there will be described hereinbelow a steering system for vehicles according to a third embodiment of the invention, comprising a front steering sub-system of constant steering ratio and a rear steering sub-system having a variable-ratio mechanism and an off-centered crank pin mechanism, the variable-ratio mechanism being of a type similar to that of the first or second embodiment of the invention.

Figure 18:
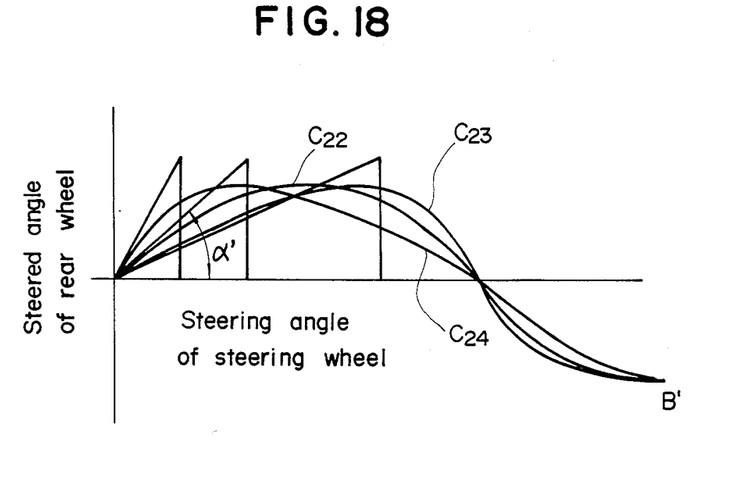
FIG. 18 is a graph showing typical available steered angles of rear wheels for various steering angles of a steering wheel in a steering system according to a third embodiment of the invention.

According to this third embodiment, due to the variable-ratio mechanism, the tangential angle $\alpha$, the tangent of which corresponds to the ratio of the rear wheels steered angle $\delta r$ to the steering wheel steering angle $\delta s$, can be selectively set, as circumstances require. As shown in FIG. 18, in which the ordinate represents a steered angle of rear wheels and the abscissa represents a steering angle of steering wheel, the rear wheel steering characteristic curve can be changed from a basic sine curve C22 with a tangential angle $\alpha'$ at the origin to various characteristic curves, as exemplified by a curve C23 less sensitive near the origin and another curve C24 more sensitive near the origin, substantially independently of a maximum steered angle B' available for the rear wheels.

Figure 19:
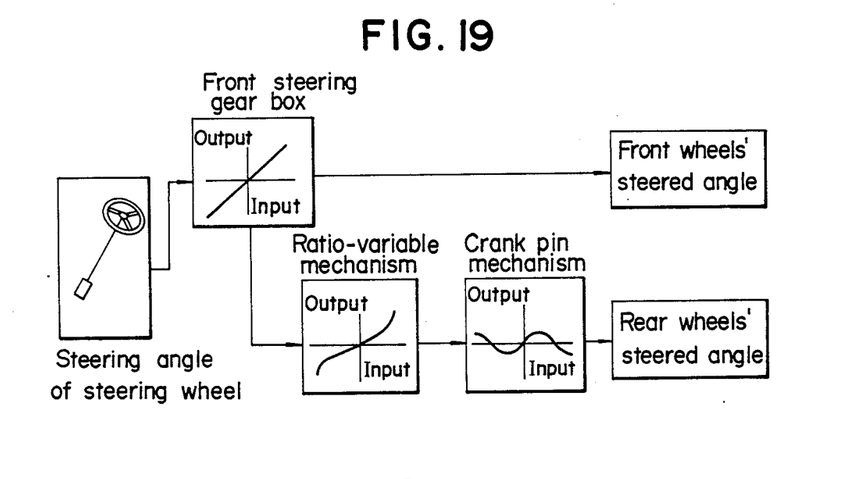
FIG. 19 is a functional block diagram of the steering system of FIG. 18.

Referring now to FIG. 19, in the steering system according to the third embodiment, the steering angle of a steering wheel is first transmitted to a front steering gearbox of a rack and pinion type, the output of which is substantially proportional to the input, thereby controlling the front wheels steered angle $\delta f$. The front steering gearbox has a part of the output sent through a variable-ratio mechanism, the output of which is a selective function of the input, and a crank pin mechanism, the output of which is substantially a sine function of the input, to rear wheels to be controlled at the above-mentioned rear wheels steered angle $\delta r$.

It will be understood that, in the steering system shown in FIG. 19, the variable-ratio mechanism may comprise a deformed drive rack with a pair of chevrons and a trough and a driven pinion with an off-centered driven shaft. In such case, the rear wheel steering characteristic curves will cross one another at the origin and a pair of nodes on the axis of $\delta s$.

Figure 20:
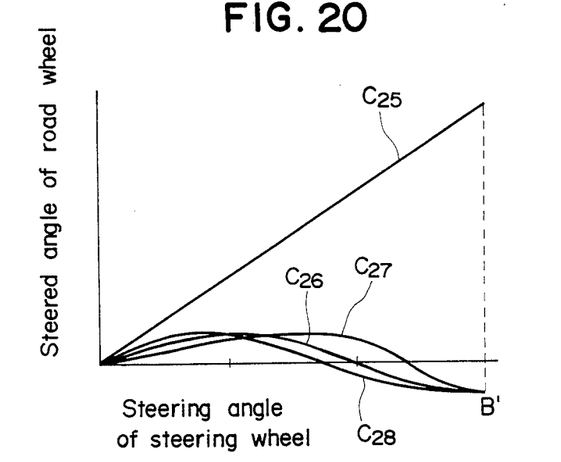
FIG. 20 is a graph showing typical available steered angles of the rear wheels for various steering angles of a steering wheel in a steering system according to a modified example of the third embodiment of FIG. 18.

It will also be apparent in the third embodiment of the invention that, instead of such variable-ratio mechanism there may be employed a modified variable-ratio mechanism comprising a driven pinion with tooth pitches gradually changed along the circumference and a drive rack with tooth pitches properly varied lengthwise from the center to both ends. In this case, as shown in FIG. 20, in which the ordinate represents a steered angle of road wheel and the abscissa represents a steering angle of steering wheel, the rear wheel steering characteristic curve will be changeable from a basic sine curve C26 to various phase-elongated or phase-contracted characteristic curves, as exemplified by a curve C27 less sensitive near the origin or another curve C28 more sensitive near the origin, substantially independently of a maximum steered angle B' available for the rear wheels, while the front wheel steering characteristic curve will be substantially straight as exemplified by a curve C25.

Further, it will be apparent that in the second and third embodiments the variable-ratio mechanism can be arranged between the crank pin mechanism and the rear wheels, instead of between the front steering gear box and the crank pin mechanism, if desired.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. In a steering system for a vehicle having a steering wheel and front and rear wheels, including:
   a front steering sub-system for steering said front wheels in accordance with the steering angle of said steering wheel; and
   a rear steering sub-system for steering said rear wheels in the same and opposite directions with respect to said front wheels in accordance with the steering angle of said steering wheel;

said rear steering sub-system being provided with an off-centered crank pin mechanism for steering said rear wheels in the same and opposite directions with respect to said front wheels in accordance with the steering angle of said steering wheel such that the rear wheel steering characteristic curve represents substantially a sine curve;

an improvement comprising:

variable-ratio means for varying the ratio of the steered angle of at least said rear wheels to the steering angle of said steering wheel in accordance with the magnitude of the steering angle of said steering wheel such that the relationship of a turning curvature of the vehicle to the steering angle of the steering wheel in the vicinity of the initial position of the rear wheels can be selectively set to any desirable predetermined relation, while maintaining a single given maximum steered angle (B) of the rear wheels;

said variable-ratio means comprises a rack and pinion mechanism provided in said rear steering sub-system;

said rack and pinion mechanism comprises an input rack deformed in a waver-like manner, an output shaft and a pinion engaged with said rack and secured to said shaft; and said shaft is off-centered with respect to the axis of said pinion.

2. In a steering system for a vehicle having a steering wheel and front and rear wheels, including:

a front steering sub-system for steering said front wheels in accordance with the steering angle of said steering wheel; and a rear steering sub-system for steering said rear wheels in the same and opposite directions with respect to said front wheels in accordance with the steering angle of said steering wheel;

said rear steering sub-system being provided with an off-centered crank pin mechanism for steering said rear wheels in the same and opposite directions with respect to said front wheels in accordance with the steering angle of said steering wheel such that the rear wheel steering characteristic curve represents substantially a sine curve;

an improvement comprising:

variable-ratio means for varying the ratio of the steered angle of at least said rear wheels to the steering angle of said steering wheel in accordance with the magnitude of the steering angle of said steering wheel such that the relationship of a turning curvature of the vehicle to the steering angle of the steering wheel in the vicinity of the initial position of the rear wheels can be selectively set to any desirable predetermined relation, while maintaining a single given maximum steered angle (B) of the rear wheels;

said variable-ratio means is adapted to vary both of the ratios of the steered angles of said front wheels and said rear wheels to the steering angle of said steering wheel;

said variable-ratio means comprises a first rack and pinion mechanism provided in said front steering sub-system and a second rack and pinion mechanism provided in said rear steering sub-system;

said first rack and pinion mechanism comprises an input shaft, an output rack deformed in a wave-like manner, and a first pinion secured to said input shaft and engaged with said output rack, said first pinion being off-centered with respect to the axis of said input shaft; and said second rack and pinion mechanism comprises an input rack deformed in a wave-like manner, an output shaft, and a second pinion engaged with said input rack and secured to said output shaft, said output shaft being off-centered with respect to the axis of said second pinion.

3. A steering system according to claim 1, wherein:

said input rack includes a pair of chevrons and a trough positioned between said chevrons.

4. A steering system according to claim 2, wherein:

said output rack of said first rack and pinion mechanism includes a pair of first chevrons and a first trough positioned between said first chevrons; and said input rack of said second rack and pinion mechanism includes a pair of second chevrons and a second trough positioned between said second chevrons.

* * * * *